May 26, 1970     S. GALLO     3,514,115
SEALING SYSTEM FOR THE ROTARY PLUG OF A NUCLEAR REACTOR
Filed Oct. 23, 1967     2 Sheets-Sheet 1

FIG. I

INVENTOR

BY

ATTORNEY

3,514,115
SEALING SYSTEM FOR THE ROTARY PLUG OF A NUCLEAR REACTOR

Sabino Gallo, Durance, France, assignor to Commissariat a l'Energie Atomique, Paris, France
Filed Oct. 23, 1967, Ser. No. 677,257
Claims priority, application France, Nov. 17, 1966, 84,067
Int. Cl. F16j *15/46;* G27b *33/00*
U.S. Cl. 277—34.3                                    7 Claims

ABSTRACT OF THE DISCLOSURE

A system which provides a tight seal between a rotary plug and the surrounding plug-support element, in which the seals can be replaced without interrupting the leak-tightness. The system comprises two tubular members which are coaxial with the plug, which are capable of moving independently of each other and which rest on the support in a leak-tight manner, collapsible seals carried by the tubular members so as to ensure leak-tightness between said members and between the inner member and the plug, and a seal which is carried by the outer member and which is capable of closing off the passage between said member and the plug when the inner member is lifted.

---

The present invention is concerned with nuclear reactors and especially those in which the reactor core is cooled by a circulation of liquid metal.

The primary object of this invention is to ensure sealing from inside to outside between a nuclear reactor pressure vessel and the rotary plug which is rotatably mounted at the top of said vessel as well as between said rotary plugs when these latter are mounted one inside the other.

In nuclear reactors, and especially those in which the reactor core is cooled by a circulation of liquid metal, it is essential to prevent any escape of active gas to the exterior under penalty of contaminating the reactor containment vessel.

It is difficult to satisfy the above condition when the rotary plugs which traverse the top of the reactor vessel are of large size, since it must additionally be ensured in such a case that leak-tightness of said plugs in no way impairs either their freedom of rotational motion or even the freedom of axial movement which may facilitate such rotation.

With this object in mind, a number of sealing systems have already been designed and tested. The system which has so far given the best results comprises a plurality of metallic seals which are solid during operation of the reactor and liquefied during shutdown of the reactor in order to permit the rotation of the plugs for the purpose of handling fuel elements, providing access to the reactor core and so forth.

In this known system, the liquefiable metallic seals can be duplicated by mechanical seals during a period in which the plugs remain stationary.

However, this solution is technologically inelegant, In particular, the equipment which is necessary for the liquefaction of the seals takes up considerable space and the seals themselves must be heavily protected against oxidation which, unless appropriate steps are taken, is liable to result in the formation of alloys whose presence would modify the melting temperature of the seals to an appreciable extent.

The aim of this invention is to overcome the above-mentioned disadvantages.

Accordingly, the invention relates to a sealing system for the rotary plug of a nuclear reactor of the type in which the reactor core is cooled by a circulation of liquid metal and in which the plug bears on the cylindrical wall of an element of the reactor which surrounds the plug in coaxial relation therewith, said sealing system being characterized in that it comprises, between the plug and the support element, two tubular members which are coaxial with the plug and which are adapted to move axially independently of each other, the lower end of each tubular member being brought to bear on a shouldered portion of said support element, at least one mechanical seal carried by the inner tubular member in order to provide leak-tightness between said tubular member and said plug, two mechanical seals consisting respectively of an upper seal and lower seal which are carried by the outer tubular member and whereby leak-tightness is provided between the two tubular members by said upper seal and between the outer tubular member and the plug by said lower seal when the inner tubular member is moved into a top position, and a static O-ring seal between the lower end of each tubular member and the corresponding shouldered portion of the support element.

The seals can be either of the "lipped" type or of the "inflatable" type. In the case last mentioned, said seals are preferably provided in the vicinity of that surface which is temporarily applied against the concentric outer plug or against the wall of the reactor vessel, with an overthickness which endows said seals with enhanced strength in this zone.

The seals which are carried by the inner tubular member are advantageously of the inflatable type and preferably have identical dimensional characteristics.

In order to complete the sealing from inside to outside of the vessel which is provided by the mechanical seals and also in order to ensure perfect leak-tightness between the outer tubular member and the reactor vessel along their opposite lateral surfaces, the sealing system preferably comprises two static seals each located between one of the bottom faces of the tubular members and the corresponding bearing surface of the support element.

The support element is advantageously provided with a single bearing surface for the purpose of receiving the lower ends of the tubular members.

The leak-tightness which is ensured by the different seals of the system is further enhanced during operation of the reactor by the presence of a cushion of rare gas such as argon which extends on the one hand between the plug, the inner tubular member and the two seals which are carried by said member and, on the other hand, between the two tubular members and the upper seal which is carried by the outer tubular member. Provision is made for rare gas inlets both in the reactor vessel and in the two tubular members.

The invention also extends to the features described hereinafter and to the various possible combinations thereof.

A device in accordance with the invention is shown by way of non-limitative example in the accompanying drawings, in which.

Figure 1:
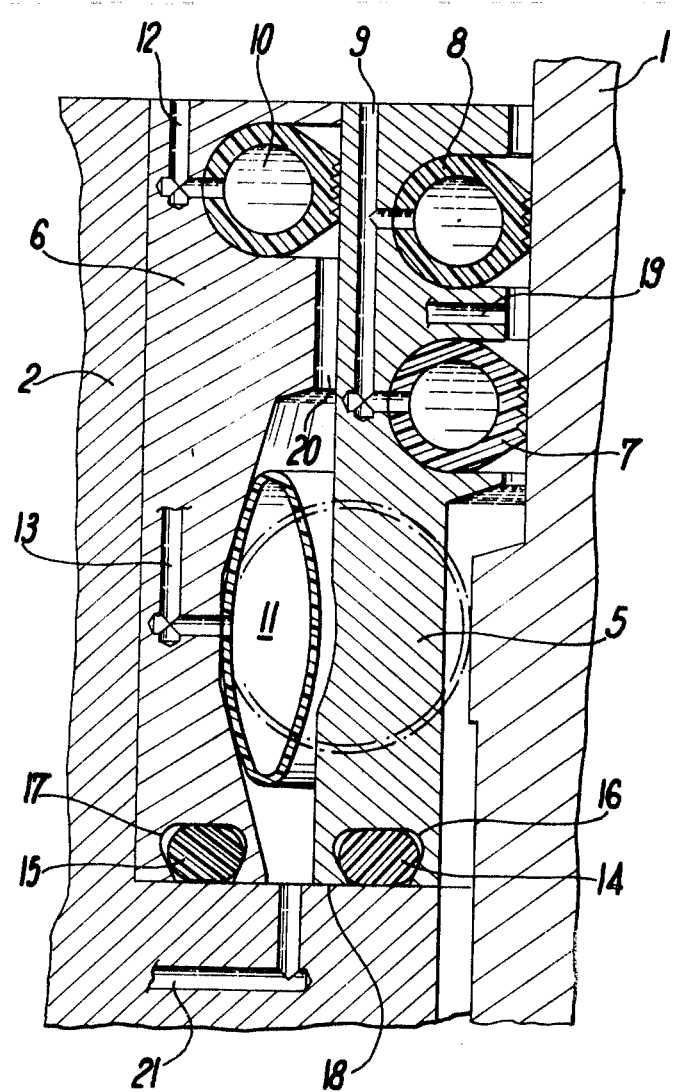
FIG. 1 is a partial front half-view of the system in accordance with the invention for providing leak-tightness between a rotary plug and the tank or pressure containment vessel of a nuclear reactor.

The system in accordance with the invention and as shown in FIGS. 1 to 6 is intended to ensure leak-tightness between a rotary plug 1 and the wall 2 of a nuclear reactor vessel. The drawings show the top portion of the vessel.

As shown in FIGS. 2 to 6, the rotary plug 1 advantageously comprises a recess 3 which bears on a shoulder 4 formed in the reactor vessel wall 2, thereby providing a first seal between the rotary plug and the vessel when the reactor is on-load. However, this arrangement entails the need to lift the plug prior to rotating this latter when the reactor is shut down.

The sealing device proper comprises two tubular members which are coaxial with the plug and capable of axial movement independently of each other. The inner tubular member 5 supports two dynamic seals 7, 8 which have the same dimensions. Said seals are fitted in blind-end recesses having their openings on that face of the tubular member 5 which is located opposite to the plug 1. The two seals referred to are annular and inflatable under the action of a gas which is admitted into said seals through ducts 9 pierced in said tubular member 5 and terminating externally of this latter in a valve (not shown in the drawings) for the purpose of connecting said ducts to a gas-supply system during the time required to inflate the seals. In their inflated position, the dynamic seals 7, 8 provide leak-tightness between the outer face of the plug and the wall of the tubular member 5.

The outer tubular member 6 is in turn adapted to support two static seals 10 and 11 which are both annular. Said seals are inflated from the exterior of the reactor vessel through ducts 12, 13 formed in the outer tubular member 6. In the same manner as the ducts 9, the ducts 12 and 13 extend to valves (not shown in the drawings) which are located outside the member 6 and on which pipes providing a connection with a gas source can be fixed for the desired length of time. Both seals 10 and 11 are contained in two blind-end recesses which have their openings on that face of the tubular member 6 which is located opposite to the tubular member 5.

The structure of the static seal 10 located at the top of the outer tubular member 6 is similar to that of the dynamic seals 7, 8 which are supported by the inner tubular member 5. The static seal 11 which is located in the lower portion of the outer tubular member is distinguished by the fact that it is capable of collapsing in the non-inflated position and of bearing on the outer face of the plug in the inflated position when the inner tubular member is located in its top position, thereby providing a tight seal between the outer tubular member and said plug.

The sealing system also comprises two solid annular static seals 14, 15 which are placed respectively in annular recesses 16, 17 formed in the bottom faces of the annular members 5, 6 and which ensure leak-tightness between the bottom faces of said members and an annular bearing surface 18 formed in the wall of the reactor vessel 2.

Ducts 19, 20 and 21 are formed respectively in the inner tubular member, in the outer tubular member and in the reactor vessel for the purpose of introducing in the free space defined between the plug 2, the dynamic seals 7, 8, between the static seals 14, 15 and 10 and between the inner and outer tubular members 5 and 6 a sufficient quantity of rare gas which serves to complete the imperviousness toward outside which is provided between the different elements referred-to. To this end, said ducts 19, 20, 21 terminate in a valve (not shown) to which a gas-storage reservoir is connected during the time required for the introduction of the gas.

Figure 2:
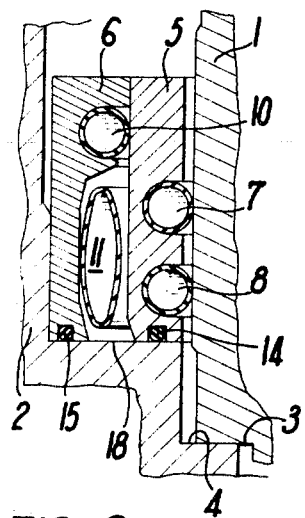
FIGS. 2 to 6 are functional diagrams showing the displacements of the different components of the device for the purpose of replacing seals.

In the normal positions of the sealing system elements shown in FIG. 2, and when the reactor is therefore at power, imperviousness toward outside is ensured on the one hand by virtue of the fact that the recess 3 of the plug 1 bears on the shoulder 4 of the reactor vessel 2 and on the other hand by means of the two dynamic seals 7, 8, the two static seals 14, 15 and the static seal 10.

Figure 3:
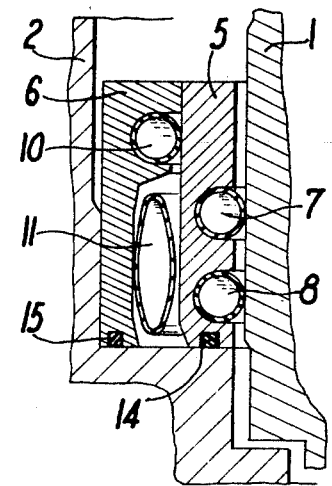

In the position of rotation of the plug 1 which is shown in FIG. 3, the reactor being shut down, imperviousness toward exterior is provided by the dynamic seals 7, 8, by the static seals 14, 15 and by the static seal 10.

Figure 4:
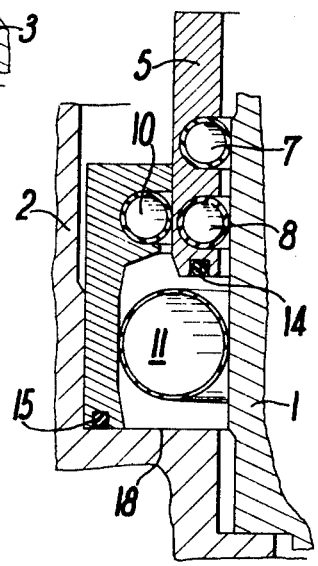
Figure 5:
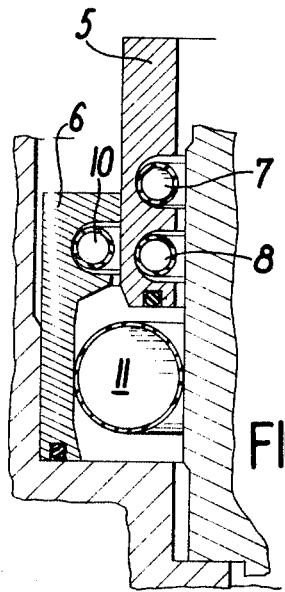
Figure 6:
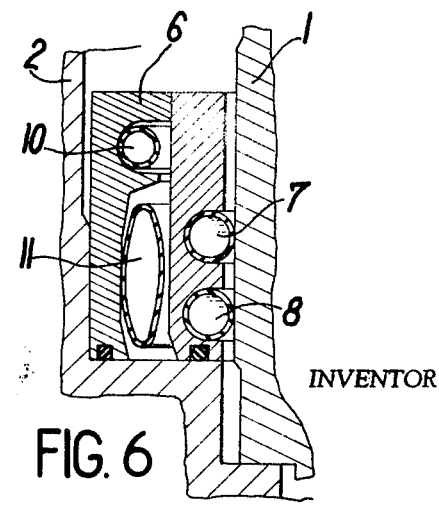

In order to effect the replacement of the dynamic seals 7, 8 when the reactor is shut down while the rotary plug 1 is maintained in its bottom position, the following operations are performed:

(a) lifting of the inner tubular member 5 to the position shown in FIG. 4;
(b) inflation of the seal 11 for the purpose of ensuring leak-tightness between the outer tubular member 6 and the plug 1;
(c) deflation of the static seal 10 and of the two dynamic seals 7, 8 (as shown in FIG. 5);
(d) removal of the inner tubular member 1 and replacement of the seals 7, 8.

In order to carry out the replacement of the static seals 10 and 11, the operation is as follows, the reactor being shut down and the plug 1 being located in its bottom position:

(a) deflation of the static seal 10,
(b) withdrawal of the outer tubular member 6 and replacement of the static seals 10, 11.

It is apparent from a study of the above-mentioned operations that the replacement of the dynamic and static seals of the device according to the invention is extremely simple and unattended by any danger, leak-tightness being continuously maintained by one portion of the device.

As is readily understood, the invention is not limited to the embodiment herein described and illustrated.

If necessary, recourse can be had to other modes and other forms of execution without thereby departing from the scope of the invention.

In particular, the static and dynamic seals could be either of the lipped type or of the inflatable type. In either case, they could advantageously be provided in the bearing zone with an overthickness which serves to increase their local mechanical strength.

What I claim is:
1. A sealing system for the rotary plugs of a nuclear reactor of the type in which the reactor core is cooled by a circulation of liquid metal and in which the plug bears on the cylindrical wall of an element of the reactor which surrounds the plug in coaxial relation therewith, said sealing system being characterized in that it comprises between the plug and the support element two tubular members which are coaxial with the plug and which are adapted to move axially independently of each other, the lower end of each tubular member being brought to bear on a shouldered portion of said support element, at least one mechanical seal carried by the inner tubular member in order to provide leak-tightness between said tubular member and said plug, two mechanical seals consisting respectively of an upper seal and lower seal which are carried by the outer tubular member and whereby leak-tightness is provided between the two tubular members by said upper seal and between the outer tubular member and the plug by said lower seal when the inner tubular member is moved into a top position, and a static O-ring seal between the lower end of each tubular member and the corresponding shouldered portion of the support element.

2. A sealing system in accordance with claim 1, characterized in that the mechanical seals are of the inflatable type.

3. A sealing system in accordance with claim 2, characterized in that the inner tubular member carries two identical inflatable seals.

4. A sealing system in accordance with claim 1, characterized in that the support element is provided with a single bearing surface for the lower ends of the tubular members.

5. A sealing system in accordance with claim 2, characterized in that the inflatable seals are formed of elastomer and are each provided with an overthickness extending at least along the entire surface which is temporarily applied against the plug or against the inner member.

6. A sealing system in accordance with claim 1, characterized in that, when the reactor is on-load, said system additionally comprises a volume of rare gas which extends on the one hand between the plug, the inner tubular member and the two seals carried by said tubular member and on the other hand between the two tubular members and the top seal which is carried by the outer tubular member.

7. A nuclear reactor comprising at least one sealing system in accordance with claim 1.

References Cited
UNITED STATES PATENTS

| | | | |
|---|---|---|---|
| 2,752,175 | 6/1956 | Fletcher | 277—34 |
| 3,261,611 | 7/1966 | Maidment | 277—34 |
| 3,400,937 | 9/1968 | Crankshaw | 277—34 X |

SAMUEL ROTHBERG, Primary Examiner

U.S. Cl. X.R.

176—87; 220—46; 277—9